UNITED STATES PATENT OFFICE.

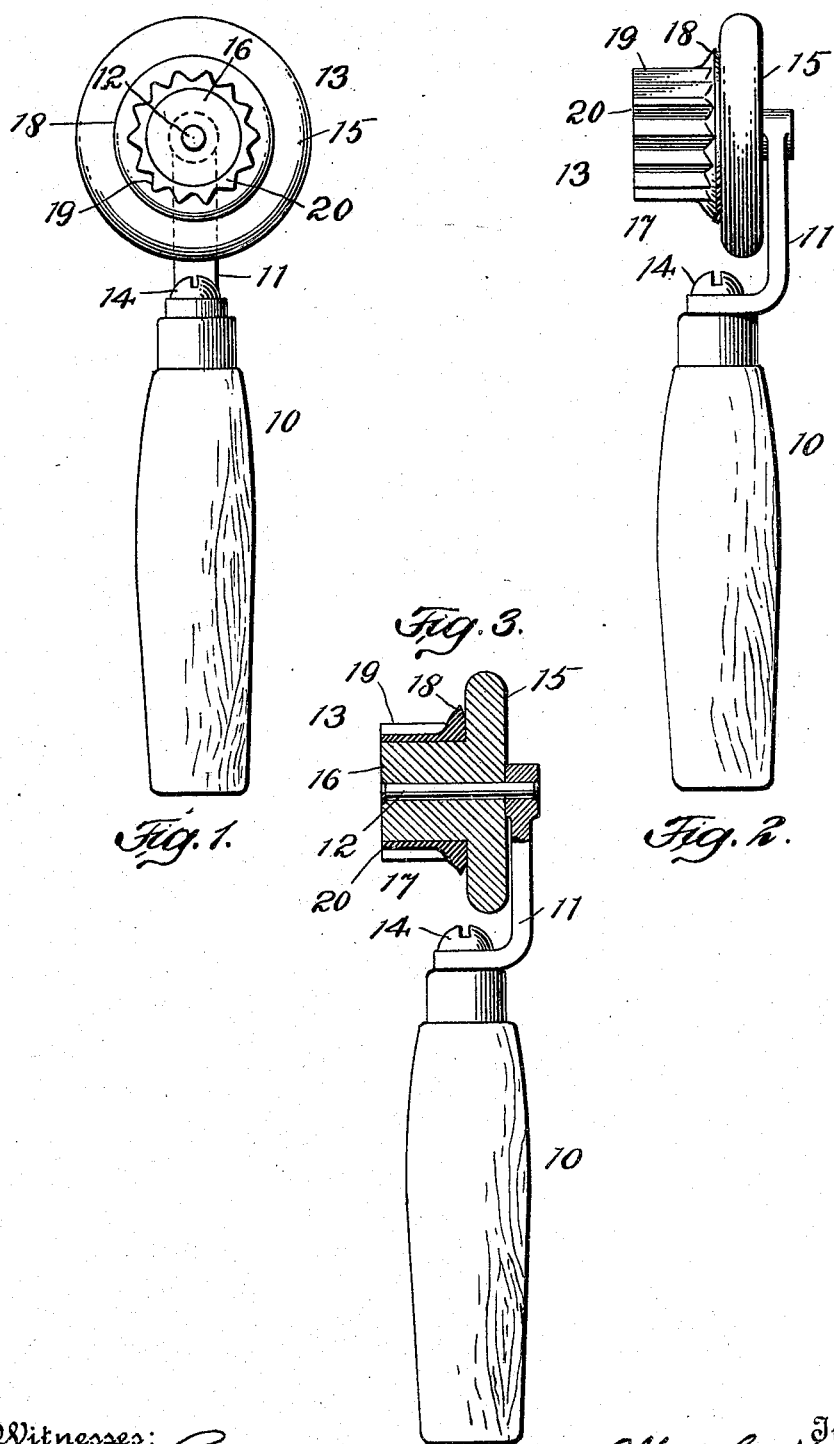

ALBERT GEORGE MOLNAR, OF CLEVELAND, OHIO.

CULINARY TOOL.

932,631.      Specification of Letters Patent.      Patented Aug. 31, 1909.

Application filed June 19, 1908. Serial No. 439,432.

*To all whom it may concern:*

Be it known that I, ALBERT GEORGE MOLNAR, a citizen of the United States, and a resident of Cleveland, county of Cuyahoga, and State of Ohio, have invented certain new and useful Improvements in Culinary Tools, of which the following is a full, clear, and exact description.

This invention relates more particularly to a tool for trimming the edges of pies, and for pressing together the edges of the members forming the pie.

The primary object of the invention is to provide a simple and efficient tool which is provided with means whereby the same may be properly guided around the edges of a pan in which the pie is to be baked, and which has means for trimming the edge of the pastry, and at the same time pressing the upper and lower layers thereof together and forming a corrugated ridge around the surface of the pie preparatory to baking the same, thus materially saving time and joining the members of the pie more effectively than is secured by the means ordinarily employed.

A further object of the invention is to provide a tool, which may be cheaply made, and which is convenient to use.

The invention will be hereinafter more particularly described with reference to the accompanying drawings, which form a part of this specification, and will then be pointed out in the claims at the end of the description.

In the drawings, Figure 1 is a front elevation of one form of tool embodying my invention. Fig. 2 is a side elevation of the tool; and Fig. 3 is a longitudinal section, partly in elevation, of the tool.

The tool may have a handle member 10 to one end of which is held a bracket or other support 11, in the outer end of which is held a stud or spindle 12, and mounted on the spindle 12 is a head 13, the said bracket 11 being angularly formed so as to permit the head to be immediately in advance of the handle member 10, and is fastened to the handle member by means of a screw 14 or otherwise. This head 13 is provided with a guide 15, from which projects a boss or sleeve 16, which boss may be integral with the guide 15, and made of wood or of any other material. The guide 15 is in the form of a disk or wheel and is adapted to engage the edge of the pie pan, and as the tool is moved forward rotates on the spindle 12. A trimming and pressing member 17 is held to the sleeve 16 or may be formed integral therewith, and said member is provided with a cutter 18 which is adapted to trim the edge of the pastry as the tool is moved around the edge of the pan, and immediately adjacent to the circular cutter 18 are the teeth 19 forming a corrugated surface or pressing member 20 on the member 17, which is adapted to press the upper layer of the pie to the lower member at the same time that the cutter is trimming the edge. By this means the tool may readily trim the layers and properly press them together at the same time forming a corrugated edge or ridge around the pie adjacent to the edge of the pan.

While I have shown the cutter member and pressing member integral, the same may be made separately, or the said members may be separately attached to the guide, or both of the same formed as a part thereof as found most desirable in manufacturing the tool.

From the foregoing it will be seen that a simple and efficient tool is provided in which a rotary head is supported upon a handle member, and the head so formed that the tool will be properly guided around the edge of a pie pan and the edge of the pastry properly trimmed along the edge of the pan; and that the upper layer of the pie will be properly pressed and bound to the lower member, all in a single operation.

Having thus described my invention, I claim as new and desire to secure by Letters Patent:—

1. A tool of the character described, comprising a handle member, and a rotary head having a guide, a cutter adjacent to the guide, and means adjacent to the cutter for pressing upon the upper surface of the pie.

2. A tool of the character described, comprising a handle member, a rotary guide, a rotary cutter adjacent to the guide, and a rotary pressing member adjacent to the cutter.

3. A tool of the character described, comprising a handle member, a rotary guide, and a combined rotary cutting and pressing member adjacent said rotary guide.

4. A tool of the character described, comprising a handle member, an angularly formed bracket held to one end of the handle member, a spindle held to the bracket, a head rotatably mounted on the spindle and provided with a circular guide adapted to engage the edge of the pie pan, a circular cutter fixed to and movable with the guide and located adjacent thereto, and a corrugated pressing member integral with the cutter and fastened to a part of the guide.

5. A tool of the character described, comprising a handle member, a bracket held to one end of the handle member, a head rotatably mounted on the bracket and provided with a circular guide adapted to engage the edge of the pie pan, a circular cutter movable with the guide and located adjacent thereto, and a corrugated pressing member fastened to a part of the guide.

6. A tool of the character described, comprising a handle member, a bracket held to one end of the handle member, a spindle held to the bracket, a guide adapted to engage the edge of the pie pan, a circular cutter located adjacent to the guide, and a corrugated pressing member integral with the cutter and movable therewith.

This specification signed and witnessed this 13th day of June A. D. 1908.

ALBERT GEORGE MOLNAR.

Witnesses:
W. C. BROCKETT,
A. W. WESTERFIELD.